(12) United States Patent
Staley

(10) Patent No.: US 6,592,047 B1
(45) Date of Patent: Jul. 15, 2003

(54) DELAYED ACTION OIL FILTER BYPASS VALVE

(75) Inventor: David Richard Staley, Flushing, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/085,531

(22) Filed: Feb. 26, 2002

(51) Int. Cl.[7] .............................. G05D 23/02; F01P 7/02
(52) U.S. Cl. ...................... 236/34.5; 236/93 A; 137/73; 137/74
(58) Field of Search ........................ 236/34, 34.5, 93 R, 236/93 A, 99 J, 99 K, 100; 137/72, 73, 74

(56) References Cited

U.S. PATENT DOCUMENTS

| | | | |
|---|---|---|---|
| 1,808,684 A | * 6/1931 | Rowley | 137/72 |
| 2,137,882 A | * 11/1938 | Nelson | 137/73 |
| 2,859,758 A | * 11/1958 | Jurs | 137/73 |
| 4,099,540 A | 7/1978 | Papp | 137/493.8 |
| 4,127,484 A | 11/1978 | Walulik et al. | 210/130 |
| 4,144,168 A | 3/1979 | Thornton | 210/130 |
| 4,174,699 A | 11/1979 | Gill | 123/196 S |
| 4,190,198 A | 2/1980 | Casuga et al. | 236/34.5 |
| 4,246,109 A | 1/1981 | Manders | 210/90 |
| 4,304,663 A | 12/1981 | Manders | 210/90 |
| 4,399,785 A | 8/1983 | Mills | 123/198 DB |
| 4,402,287 A | 9/1983 | Cochran | 123/196 A |
| 4,406,784 A | 9/1983 | Cochran | 210/168 |
| 4,416,592 A | 11/1983 | Lindtveit | 417/290 |
| 4,462,352 A | 7/1984 | Mills | 123/198 DB |
| 4,476,825 A | 10/1984 | Mills | 123/198 DB |
| 4,755,289 A | 7/1988 | Villani | 210/132 |
| 5,124,052 A | 6/1992 | Hardaker | 210/774 |
| 5,180,490 A | 1/1993 | Eihusen et al. | 210/239 |
| 5,193,621 A | 3/1993 | Manke et al. | 166/386 |
| 5,339,776 A | 8/1994 | Regueiro | 123/196 CP |
| 5,511,576 A | * 4/1996 | Borland | 137/72 |
| 5,540,249 A | * 7/1996 | Johnson et al. | 137/73 |
| 5,843,284 A | 12/1998 | Waters et al. | 196/46.1 |
| 6,096,199 A | 8/2000 | Covington | 210/130 |

* cited by examiner

Primary Examiner—William E. Tapolcal
(74) Attorney, Agent, or Firm—Leslie C. Hodges

(57) ABSTRACT

A bypass valve assembly, comprising: (a) a housing 12 having an inlet 16 and an outlet 18; (b) a valve member 20 disposed within the housing and being movable between a closed position and an open position; and (c) a slug of material 30 disposed in an initial substantially solid phase in contact with the valve member 20 so as to maintain the valve member in the closed position. The slug of material 30 is subsequently heatable into a substantially softened phase so as to permit the valve member 20 to move into the open position.

24 Claims, 2 Drawing Sheets

DELAYED ACTION OIL FILTER BYPASS VALVE

TECHNICAL FIELD

The present invention relates generally to valves for fluid media, and more particularly to bypass valves.

BACKGROUND OF THE INVENTION

In the use of practically any sort of machinery with moving parts, it is common practice to provide some sort of lubrication system as part of (or operatively associated with) such machinery. For example, most internal combustion engines include a lubrication system in which oil is pumped through passages within the engine block such that certain moving parts (e.g., pistons, cams, etc.) are lubricated therewith. Substantially all of such lubrication systems include some type of filter which filters out particulates that may be found in the circulating fluid lubricant.

When these filters become clogged with accumulated particulates, it becomes increasingly difficult to continue circulating the fluid lubricant through the filter, giving rise to the need for some way of temporarily bypassing the filter until the filter (or its filtration medium) can be replaced. These methods for temporarily bypassing the filter may take the form of bypass valves—which may be part of the filter or which may be positioned at some other point in the lubrication circuit apart from the filter—or they may take other forms. For example, U.S. Pat. Nos. 4,099,540 to Papp; 4,127,484 to Walulik et al.; 4,144,168 to Thornton; 4,174,699 to Gill; 4,190,198 to Casuga et al.; 4,246,109 to Manders; 4,304,663 to Manders; 4,399,785 to Mills; 4,402,287 to Cochran; 4,406,784 to Cochran; 4,416,592 to Lindtveit; 4,462,352 to Mills; 4,476,825 to Mills; 4,755,289 to Villani; 5,124,052 to Hardaker; 5,180,490 to Eihusen et al.; 5,193,621 to Manke et al.; 5,339,776 to Regueiro; 5,843,284 to Waters et al.; and 6,096,199 to Covington, all of which are incorporated herein by reference as if set forth herein in full, teach various aspects of bypass valves and/or methods of bypassing a filter in a lubrication or oil circulation/oil pumping system.

Oil filter bypass valves/bypass systems are typically designed to accommodate the aforementioned "clogged filter" situation. However, there exists yet another potential problem separate from the clogged filter situation which heretofore has not been addressed in the prior art: namely, the potential for inadvertently circulating metal chips and/or other particulates during the initial running of the engine. Such particulates may be left over from the machining and other manufacturing processes used to create the engine block, cylinder blocks, etc., and may lie hidden or lodged within the galleys and other oil circuits within the engine. After an engine manufacturer produces an engine, the engine is typically run for a short time to make sure the engine is working properly and to conduct certain tests and calibrations. During this initial run, the oil is typically cold, causing a temporary increase in pressure drop (i.e., a perceived increase in pressure, a resistance) across the oil filter. This increased resistance across the filter forces open the normally-closed oil filter bypass valve, thus allowing unfiltered, potentially particulate-laden oil to flow around (rather than through) the oil filter and thence into the engine. This bypass situation occurs not because the filter is clogged, but because of the increased pressure drop across the filter due to the initial low temperature/high viscosity of the oil. Once the oil is sufficiently heated and thinned, the pressure drop/resistance decreases across the filter and the bypass valve closes, thereupon diverting the oil through the filter rather than around it. As mentioned above, this temporary bypassing of the oil filter during the first few cycles of a new engine may cause circulation of metal chips and particulates that may damage various engine components.

It would be desirable, therefore, to provide a bypass valve which performs the normal oil filter bypass function when the filter is clogged, but which also can delay this bypass function during the initial cycles of a newly assembled engine until after the oil becomes sufficiently heated.

SUMMARY OF THE INVENTION

The present invention overcomes the disadvantages of the prior art approaches by providing a delayed action bypass valve assembly. This bypass valve assembly comprises: a housing having an inlet and an outlet; a valve member disposed within the housing and being movable between a closed position and an open position; and a slug of material disposed in an initial substantially solid phase in contact with the valve member so as to maintain the valve member in the closed position. The slug of material is subsequently heatable into a substantially softened phase so as to permit the valve member to move into the open position. In the closed position, the valve member is sealably disposed against the housing inlet to prevent fluid flow therethrough, while in the open position the valve member is disposed away from the inlet, thereby permitting fluid flow therethrough.

It is an object and advantage that the present invention provides an initial delay of the bypass action in a bypass valve. When used in conjunction with an engine and its oil circulation system as described herein, an oil filter bypass valve according to the present invention helps to mitigate the effects of any inadvertent circulation of particulate contaminants in the engine during the initial cycles of the engine.

These and other advantages, features and objects of the invention will become apparent from the drawings, detailed description and claims which follow.

DESCRIPTION OF THE PREFERRED EMBODIMENT

Figure 2:
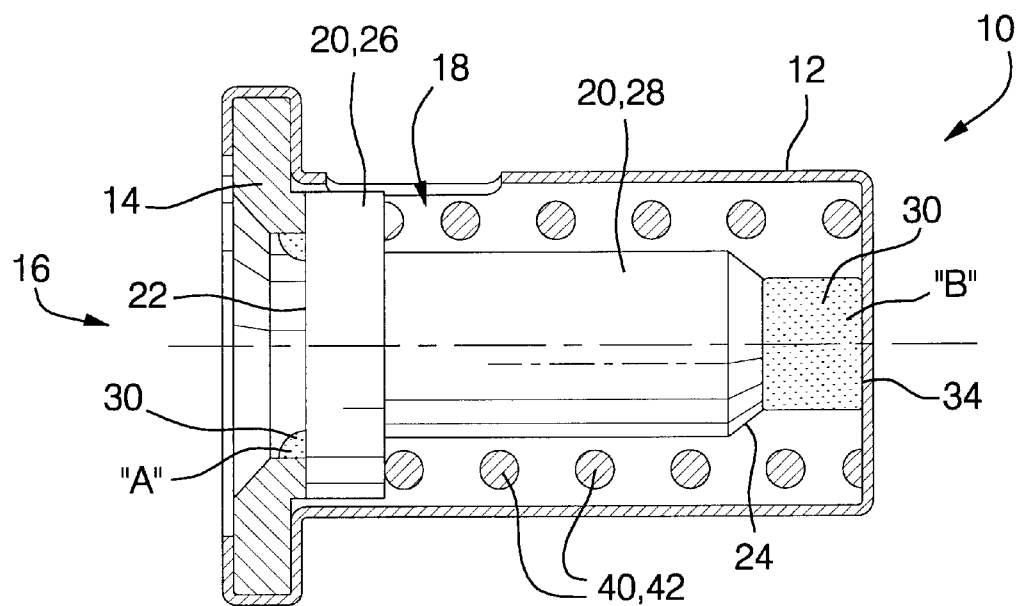
FIGS. 2–3 are cross-sectioned side views of a bypass valve assembly in a closed position according to two embodiments of the present invention, showing T-shaped and ball-shaped valve members, respectively.
Figure 3:
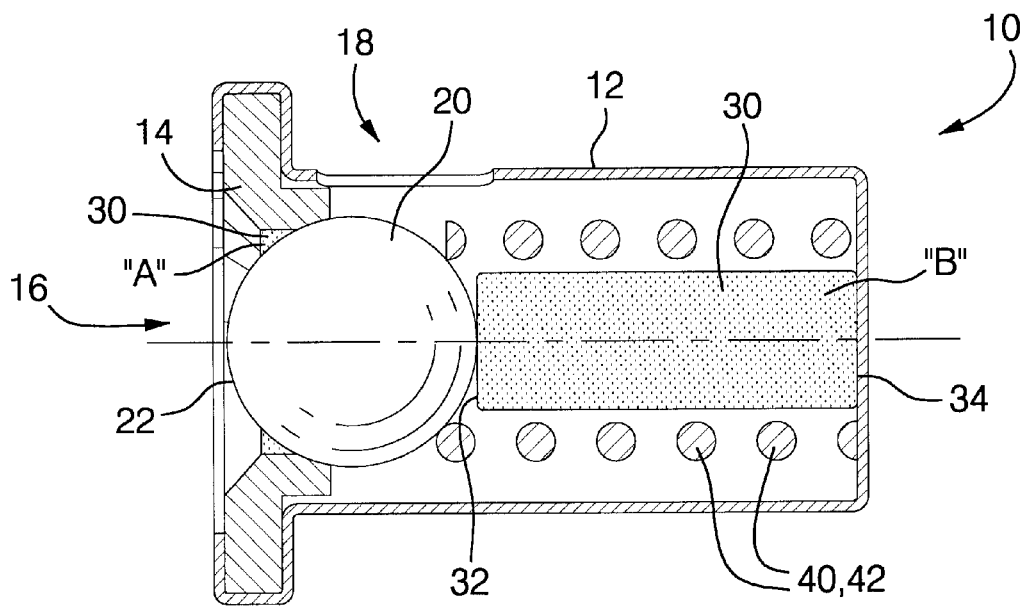
Figure 4:
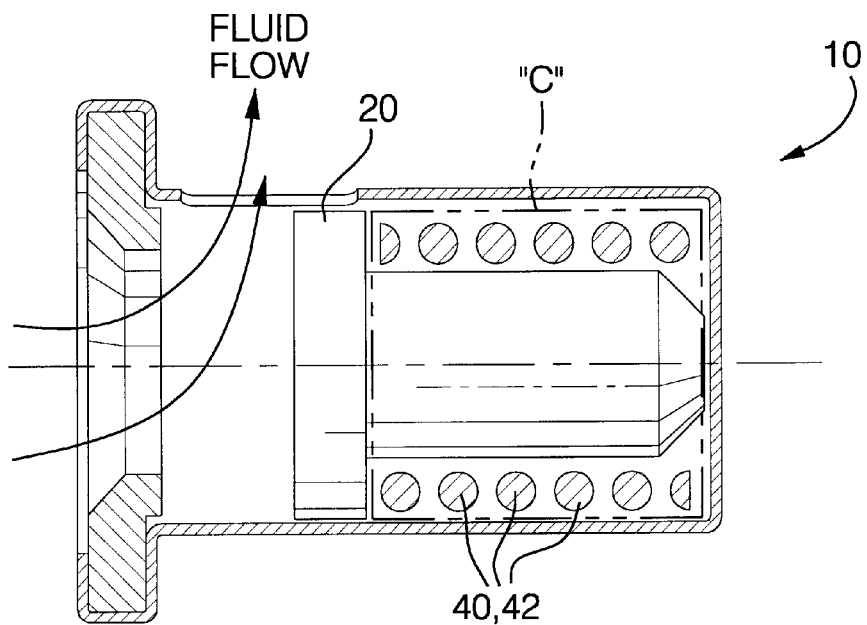
FIG. 4 shows the bypass valve assembly of FIG. 2, but in an open position.

Referring now to the drawings, FIGS. 2–4 show a delayed action bypass valve assembly 10 according to the present invention. This bypass valve assembly comprises: (a) a housing 12 having an inlet 16 and an outlet 18; (b) a valve member 20 disposed within the housing and being movable between a closed position and an open position; and (c) a slug of material 30 disposed in an initial substantially solid phase in contact with the valve member 20 so as to maintain the valve member in the closed position. The slug of material 30 is subsequently heatable into a substantially softened phase so as to permit the valve member 20 to move into the open position. In the closed position, the valve member 20 is sealably disposed against the housing inlet 14 to prevent fluid flow therethrough, while in the open position the valve member 20 is disposed away from the inlet 14, thereby permitting fluid flow therethrough.

To assist the reader in understanding the present invention, all reference numbers used herein are summarized in the table below, along with the elements they represent:

10=Bypass valve assembly
12=Housing
14=Lip/land portion of housing
16=Inlet
18=Outlet
20=Valve member
22=Face of valve member
24=End of valve member opposed from face 22
26=Head of T-shaped valve member
28=Pintel of T-shaped valve member
30=Slug of material
32=First end of material slug
34=Second end of material slug
40=Biasing element
42=Coils/biasing portions of biasing element
A=Slug of material location adjacent inlet 16
B=Slug of material location behind valve member 20
C=Slug of material location between coils 42

Figure 1:
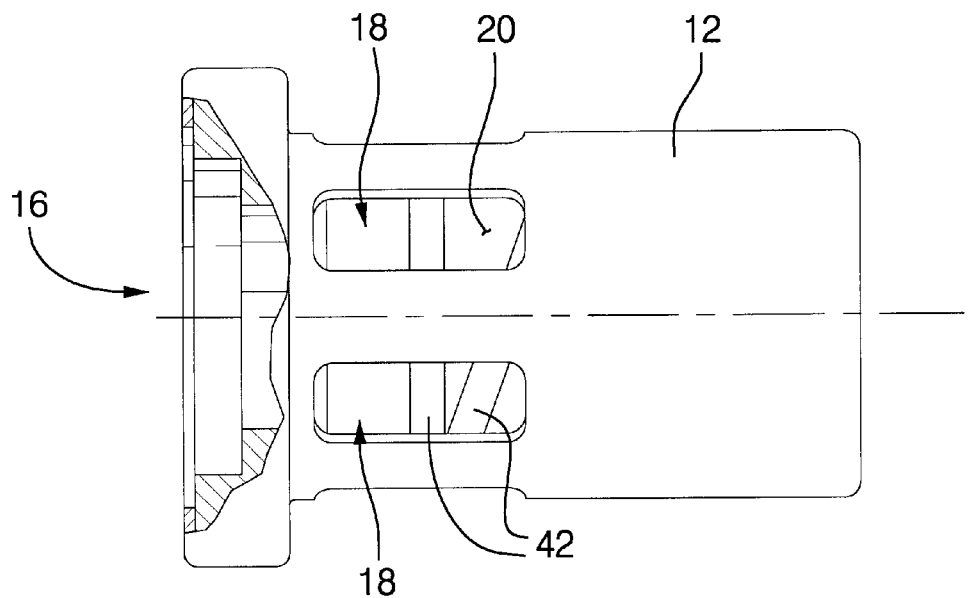
FIG. 1 is a partially cross-sectioned side view of a typical bypass valve according to the prior art.

The housing 12 is typically cylindrical and made of formed metal, but may assume practically any desired shape and be made out of any suitable material which can withstand engine temperatures without substantial deformation and which is not harmed by contact with engine oil (e.g., some plastics). The housing has at least one inlet 16 and at least one outlet 18. As illustrated in FIG. 1, a typical cylindrical housing 12 may have one inlet 16 centrally located on one end face of the housing, with multiple outlets 18 arranged circumferentially about the cylindrical wall of the housing. However, the positioning of the inlet(s) 16 and outlet(s) 18 may assume various other configurations.

The valve member 20 may be substantially T-shaped, such as having a disc-shaped head 26 and an optional pintel 28 as illustrated in FIG. 2, or substantially ball-shaped as shown in FIG. 3, or any other suitable configuration. The face 22 of the valve member 20 may be substantially flat (e.g., FIG. 2), substantially spherical (e.g., FIG. 3), or any other suitable shape, so long as the valve member seals the inlet 16 when disposed thereagainst, thus precluding fluid flow therethrough.

The slug of material 30 may be formed in a variety of shapes, from a variety of materials, and positioned in relation to the rest of the bypass valve elements in a variety of ways. For example, a good candidate for the slug material may be a paraffin wax that is specially formulated to have a softening or melting temperature at a predetermined temperature. Other candidate materials include beeswax or other waxes, certain thermoplastics, selected hydrocarbons, petrolatum, petroleum jelly or other petroleum byproducts, and the like, including any combination of the foregoing. Some key qualities which may determine the selection of material(s) used include: (a) the material should remain in substantially solid or semisolid form below a predetermined temperature, so as to be able to keep the valve member 20 in the closed position against the inlet 16 and to sufficiently restrain the valve member 20 against opening; and (b) the material should become substantially softened, pliable, and/or melted above the predetermined temperature, so as to no longer substantially restrain the valve member 20, but should allow the valve member to move or be moved away from the inlet so that fluid may flow therethrough (i.e., the bypass valve would be open, allowing the fluid to bypass the filter). The material may also optionally have other characteristics suited to a particular environment or application. For example, the material may also include or serve as a detergent, a dispersant, a viscosity modifier, a physical/chemical taggant, and/or the like.

The material 30 should be formulated such that it has a "softening point" (i.e., a melting point, a yield point, a deformation point, etc.) at or around the aforementioned predetermined temperature. Whether the material 30 should melt or merely become softened/pliable above this temperature depends on several factors, such as: (a) the force F1 exerted on the face 22 of the valve member 20 by the fluid outside the housing; (b) the amount of opposing force offered by the valve member 20 against the fluid force F1 (such as may be caused by a biasing member 40, etc.); (c) whether the slug material 30 is desired to completely melt and become intermixed with the fluid/oil, or to merely become softened and substantially remain intact within the housing 12; (d) whether the slug material 30 returns to its initial solid/semisolid form after the initial exposure to temperatures above the predetermined softening point (or does it assume a different, "softer" form or phase when the material 30 cools below the softening point from its initial excursion above this temperature, such that the slug no longer effectively prevents the valve member 20 from opening); (e) whether the slug 30 will be placed "in front" of the valve member 20 at the interface between the valve face 22 and the inlet/lip 16/14 (as indicated by reference letter "A" in FIGS. 2–3), and/or whether the slug 30 will be placed within the housing 12 "behind" the valve member 20 (as indicated by reference letter "B"); and the like. For typical engine applications, a recommended predetermined temperature/softening point may be approximately 120° F., or at some other selected temperature within the normal operating oil temperature range of the engine.

It may be desirable that above the predetermined temperature/softening point, the slug of material 30 completely dissolves and mixes in with the fluid. For example, if the slug 30 is made of very-high-density petrolatum jelly, it would very easily mix in with a petroleum-based engine oil and might not later solidify into any problem-causing "chunks". Likewise, if a non-petroleum-based engine oil is used, one may use a slug 30 made from a material similar to the oil so that when the slug melts it mixes harmlessly into the oil.

As previously mentioned and as indicated in FIGS. 2–3, the slug 30 may be positioned in position "A" in contact with both the valve member 20 and the inlet/lip region 16/14 of the housing 12. Alternatively, the slug 30 may be disposed within the housing such that its first end 32 contacts the inner face or surface 24 of the valve member, and its second end 34 directly or indirectly contacts the interior of the housing, as indicated by reference letter "B" in the drawings. (As used here, "indirect" contact means that the slug's second end 34 may be in contact with some intermediate element between itself and the housing, such as a spacer or standoff. However, such an intermediate element would itself be in contact with the housing, thus placing the slug second end 34 in indirect contact with the housing.)

Another material quality for the slug 30 which may be desired in some applications might be the ability of the material to bond to the valve member 20, and/or to the housing/inlet 12/16. This quality may be useful for applications similar to that illustrated by reference letter "A" in FIGS. 2–3, where it would be useful for the material 30 to bond to the valve member 20 (and optionally to the inlet/lip 16/14 as well) in order to prevent the valve member 20 from opening. Of course, it would then be desirable that the material 30 melt or soften above the predetermined softening point such that the bond is broken and the valve member may then be pressed inward by the fluid pressure as needed.

As shown in FIGS. 2–4, a biasing element 40 (such as a compression spring, cantilever spring, Belleville spring, or the like) may optionally be included as part of the bypass valve assembly 10. The biasing element 40 may be placed within the housing to maintain the valve member 20 in its normally-closed position in sealable contact against the inlet 16. In some designs, it may be desirable to place the slug of material 30 between/among the coils or biasing portions 42 of the biasing element, as indicated by the dashed lines and reference letter "C" in FIG. 4. In this drawing, the dashed line indicate where the slug of material 30 was situated prior to being melted away.

The bypass valve assembly 10 may be formed in much the same manner that is typically used to form conventional bypass valves; however, some consideration must be given to where the slug of material 30 is to be situated, and how to situate it during the manufacturing process. If the slug 30 is to be located in position "A", then the valve may be formed as is normally done, with the material 30 then being applied by dipping, tube dispensing, or the like. (The material 30 may be applied sparingly to substantially only the circumferential interface between the inlet 16 and valve member face 22, as illustrated in FIG. 2, or applied more liberally across most or all of the valve face 22, as in FIG. 3.) If the slug 30 is to be located in position "B", then the slug may need to be positioned in the housing 12 prior to inserting the valve member 20 therein. (If a biasing element 40 is to be used, the slug 30 may be inserted before or after insertion of the biasing element.) If the slug material 30 is to be positioned between/among the coils 42 of the biasing element/spring as in-position "C", then the material 30 may be melted and poured into the spring-housing assembly, then the valve member 20 may be inserted therein, while then allowing the material 30 to cool and solidify among the coils.

A method for using the present delayed action bypass valve includes the steps of: (a) providing the herein-described bypass valve 10 in an engine; (b) running the engine to circulate the engine oil for a first time period during which the slug of material 30 remains below a predetermined softening temperature and in a substantially solid state, thereby keeping the bypass valve closed; and (c) continuing to run the engine while the slug of material heats above the given temperature and softens/melts, thereby allowing the bypass valve to subsequently open as needed.

Various other modifications to the present invention may occur to those skilled in the art to which the present invention pertains. For example, although the word "oil" has been used herein to describe a lubricant fluid which may be used with the present invention, it should be apparent that other non-oil lubricants, and even other non-lubricant fluids, may be used with the present bypass valve assembly 10. Additionally, although a candidate application for the present invention certainly includes an internal combustion engine, it should be noted that the bypass valve assembly 10 may likewise be used with non-engine lubrication systems, and also with applications beyond just lubrication systems (e.g., hydraulic systems, water supply systems, etc.). Furthermore, although the present invention has efficacy as a filter bypass valve, it should be apparent that it may also serve as valve where no filter is used in conjunction therewith, or where no bypass function is necessarily needed, such as in pressure-relief valve applications where an initial, one-time delay is desired. Other modifications not explicitly mentioned herein are also possible and within the scope of the present invention. It is the following claims, including all equivalents, which define the scope of the present invention.

What is claimed is:

1. A bypass valve assembly, comprising:
   (a) a housing having an inlet and an outlet;
   (b) a valve member disposed within said housing and being movable between a closed position and an open position, wherein in said closed position said valve member is sealably disposed against said inlet to prevent fluid flow therethrough, and wherein in said open position said valve member is disposed away from said inlet to permit fluid flow therethrough;
   (c) a slug of material disposed in an initial substantially solid phase in contact with said valve member so as to maintain said valve member in said closed position, said slug of material being subsequently heatable into a substantially softened phase so as to permit said valve member to move into said open position; and
   (d) a biasing element within said housing, wherein said biasing element exerts a biasing force against said valve member so as to bias said valve member in said closed position.

2. A bypass valve assembly according to claim 1, wherein said slug of material is a wax, a paraffin, a thermoplastic, a hydrocarbon, a petroleum jelly or other petroleum byproduct, or the like, including any combination of the foregoing.

3. A bypass valve assembly according to claim 1, wherein said slug of material has a softening point at a predetermined temperature, whereby said slug of material is substantially solid or semisolid below said softening point and is substantially pliable above said softening point.

4. A bypass valve assembly according to claim 3, wherein said slug of material prevents said valve member from opening when said slug of material is below said softening point, and wherein said slug of material softens and permits said valve member to open when said slug of material is above said softening point.

5. A bypass valve assembly according to claim 3, wherein said predetermined temperature is within a normal operating engine oil temperature range.

6. A bypass valve assembly according to claim 5, wherein said predetermined temperature is 120° F.

7. A bypass valve assembly according to claim 1, wherein said slug of material has first and second ends and is disposed within said housing, wherein said first end is disposed in contact with said valve member, and wherein said second end is disposed directly or indirectly against said housing, so as to constrain said valve member against opening.

8. A bypass valve assembly according to claim 1, wherein said slug of material is disposed in contact with both said inlet and said valve member.

9. A bypass valve assembly according to claim 8, wherein said slug of material is bonded to said valve member.

10. A bypass valve assembly according to claim 1, wherein said valve member is a ball.

11. A bypass valve assembly according to claim 1, wherein said valve member is a solid of revolution having a substantially T-shaped longitudinal cross-section.

12. A bypass valve assembly according to claim 1, wherein said valve member has a substantially spherical face which seals against said inlet in said closed position.

13. A bypass valve assembly according to claim 1, wherein said valve member has a substantially flat face which seals against said inlet in said closed position.

14. A bypass valve assembly according to claim 1, wherein said biasing element is a spring disposed in biasing contact with said valve member.

15. A bypass valve assembly according to claim 1 wherein said slug of material is disposed within said housing between coils of said spring so as to prevent said spring from being compressed and maintaining said valve member in said closed position.

16. A bypass valve assembly according to claim 1, wherein said substantially softened phase is a liquid phase.

17. A bypass valve assembly, comprising:
 (a) a housing having an inlet and an outlet;
 (b) a valve member disposed within said housing and being moveable between a closed position and an open position, wherein in said closed position said valve member is sealably disposed against said inlet to prevent fluid flow therethrough, and wherein in said open position said valve member is disposed away from said inlet to permit fluid flow therethrough;
 (c) a biasing element within said housing, wherein said biasing element exerts a biasing force against said valve member so as to bias said valve member in said closed position; and
 (d) a slug of material disposed in an initial substantially solid phase in contact with said valve member so as to maintain said valve member in said closed position, said slug of material being subsequently meltable into a substantially liquid phase so as to permit said valve member to move into said open position.

18. A bypass valve assembly according to claim 17, wherein said slug of material is a wax, a paraffin, a thermoplastic, a hydrocarbon, a petroleum jelly or other petroleum by-product, or the like, including any combination of the foregoing.

19. A bypass valve assembly according to claim 17, wherein said slug of material has a melting point at a predetermined temperature, whereby below said melting point said slug of material is substantially solid or semisolid and prevents said valve member from opening, and wherein above said melting point said slug of material melts and permits said valve member to open.

20. A method for initially delaying the bypass action of a bypass valve as part of a heat-generating system, comprising the steps of:
 (a) providing the bypass valve, wherein the bypass valve includes:
  (1) a housing having an inlet and an outlet;
  (2) a valve member disposed within the housing and being moveable between a closed position and an open position, wherein in the closed position the valve member is sealably disposed against the inlet to prevent fluid flow therethrough, and wherein in the open position the valve member is disposed away from the inlet to permit fluid flow therethrough;
  (3) a biasing element within the housing, wherein the biasing element exerts a biasing force against the valve member so as to bias the valve member in the closed position; and
  (4) a slug of material disposed in an initial substantially solid phase in contact with the valve member so as to maintain the valve member in the closed position, the slug of material being subsequently heatable above a predetermined softening temperature into a substantially softened phase so as to permit the valve member to move into the open position;
 (b) operating the heat-generating system for a first time period during which the slug of material remains below the predetermined softening temperature and in a substantially solid state, thereby keeping the bypass valve closed; and
 (c) continuing to operate the heat-generating system while the slug of material heats above the predetermined softening temperature and softens or melts, thereby allowing the bypass valve to subsequently open as needed.

21. A method according to claim 20, wherein the heat-generating system is an internal combustion engine.

22. A method for initially delaying the bypass action of an oil filter bypass valve in an engine, comprising the steps of:
 (a) providing the oil filter bypass valve, wherein the oil filter bypass valve includes:
  (1) a housing having an inlet and an outlet;
  (2) a valve member disposed within the housing and being moveable between a closed position and an open position, wherein in the closed position the valve member is sealably disposed against the inlet to prevent fluid flow therethrough, and wherein in the open position the valve member is disposed away from the inlet to permit fluid flow therethrough;
  (3) a biasing element within the housing, wherein the biasing element exerts a biasing force against the valve member so as to bias the valve member in the closed position; and
  (4) a slug of material disposed in an initial substantially solid phase in contact with the valve member so as to maintain the valve member in the closed position, the slug of material being subsequently heatable above a predetermined softening temperature into a substantially softened phase so as to permit the valve member to move into the open position;
 (b) running the engine for a first time period during which the slug of material remains below the predetermined softening temperature and in a substantially solid state, thereby keeping the oil filter bypass valve closed; and
 (c) continuing to run the engine while the slug of material heats above the predetermined softening temperature and softens or melts, thereby allowing the oil filter bypass valve to subsequently open as needed.

23. A bypass valve assembly, comprising:
 (a) a housing having an inlet and an outlet;
 (b) a valve member disposed within said housing and being movable between a closed position and an open position, wherein in said closed position said valve member is sealably disposed against said inlet to prevent fluid flow therethrough, and wherein in said open position said valve member is disposed away from said inlet to permit fluid flow therethrough;
 (c) a slug of material disposed in an initial substantially solid phase in contact with said valve member so as to maintain said valve member in said closed position, said slug of material being subsequently heatable into a substantially softened phase so as to permit said valve member to move into said open position;
 (d) a biasing element within said housing, wherein said biasing element exerts a biasing force against said valve member so as to bias said valve member in said closed position;

(e) said biasing element being a spring disposed in biasing contact with said valve member; and (f) said slug of material being disposed within said housing between coils of said spring, so as to prevent said spring from being compressed and maintaining said valve member in said closed position.

24. For use in initially delaying the bypass action of an oil filter in an engine wherein oil is pumped through passages, a filter bypass valve assembly, comprising:

(a) a housing having an inlet passage adapted to receive the oil being pumped and an outlet passage;

(b) a valve member disposed within said housing and being movable between a closed position and an open position, wherein in said closed position said valve member is sealably disposed against said inlet to prevent oil being pumped therethrough, and wherein in said open position said valve member is disposed away from said inlet to permit oil being pumped therethrough; and (c) a slug of material disposed in an initial substantially solid phase in contact with said valve member so as to maintain said valve member in said closed position for an initial delay of the bypass action, said slug of material being subsequently heatable into a substantially softened phase so as to permit said valve member to move into said open position; and the material of said slug material being selectable depending on whether the slug material is to completely melt to intermix with the oil being pumped or to remain substantially intact within the housing.

* * * * *